Feb. 10, 1925.
P. D. EGAN
1,526,270
CHILD'S VEHICLE
Filed Oct. 26, 1923
3 Sheets-Sheet 1
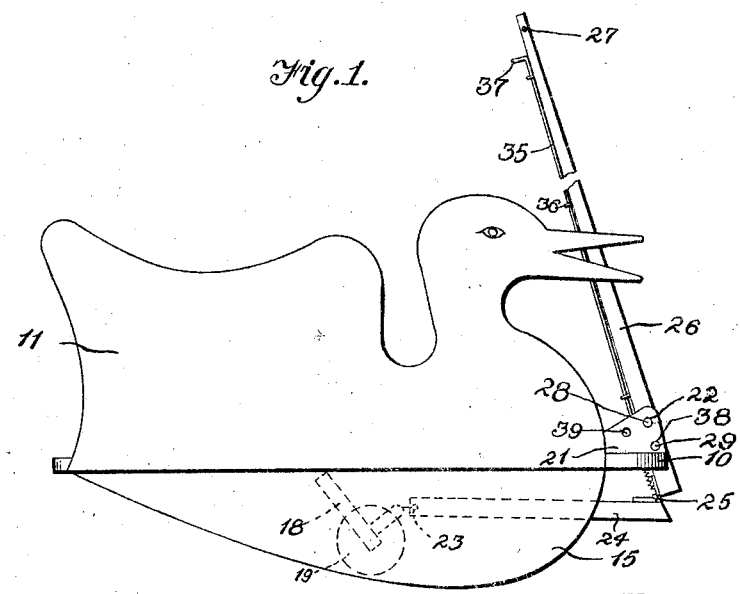
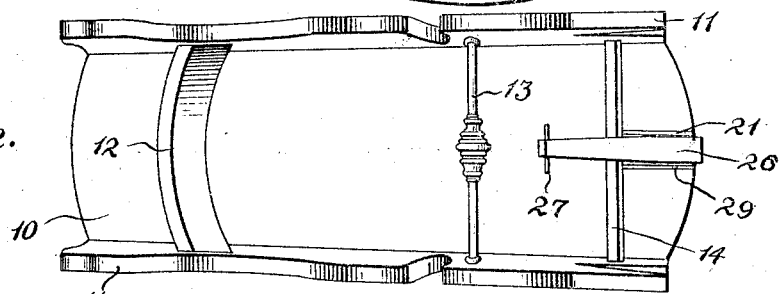
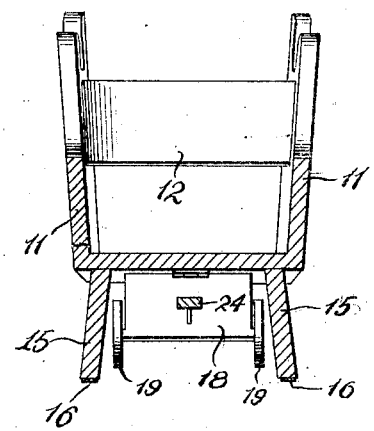
P. D. Egan
INVENTOR
BY Victor J. Evans
ATTORNEY
M. J. Trainor
WITNESS:

Feb. 10, 1925.

P. D. EGAN 1,526,270

CHILD'S VEHICLE

Filed Oct. 26, 1923

P. D. Egan
INVENTOR

BY Victor J. Evans
ATTORNEY

M. J. Trainor
WITNESS:

Feb. 10, 1925.
P. D. EGAN
1,526,270
CHILD'S VEHICLE
Filed Oct. 26, 1923
3 Sheets-Sheet 3
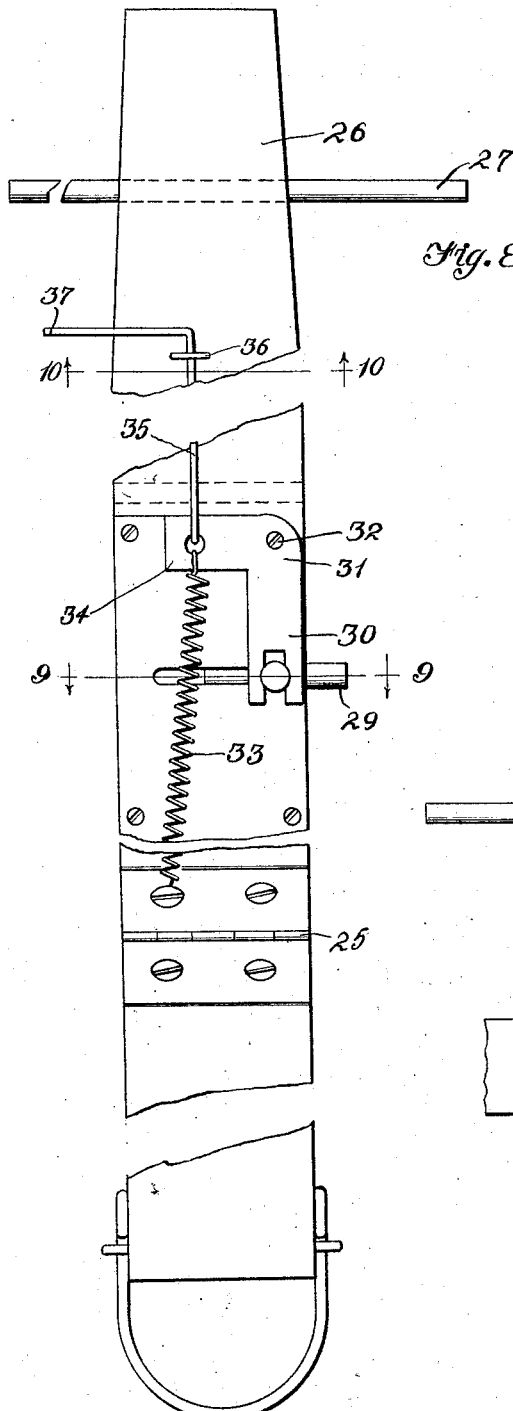
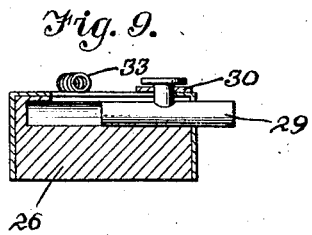
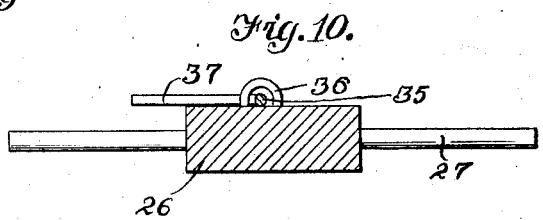
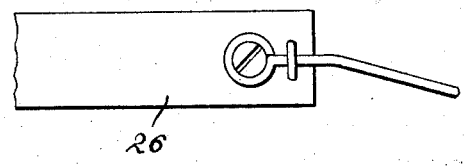
P. D. Egan
INVENTOR Patented Feb. 10, 1925.

1,526,270

UNITED STATES PATENT OFFICE.

PATRICK D. EGAN, OF MALVERN, ARKANSAS.

CHILD'S VEHICLE.

Application filed October 26, 1923. Serial No. 670,983.

*To all whom it may concern:*

Be it known that I, PATRICK D. EGAN, a citizen of the United States, residing at Malvern, in the county of Hot Spring and State of Arkansas, have invented new and useful Improvements in Children's Vehicles, of which the following is a specification.

This invention relates to vehicles for infants or small children and has for its object the provision of a novel device which may be used as a rocker, sled or wagon.

An important and more specific object is the provision of a device of this character which is mounted on rockers so that a child may rock itself back and forth in the well known manner of rocking horses of the nursery type, the rockers being also usable as sled runners in case the device is pulled along a snowy or icy surface, the device furthermore including dirigible wheels which may be swung into operative position whereby to convert the vehicle into a cart or wagon.

Another object is the provision of a vehicle of this character which is quickly and easily convertible from one form into another and which is provided with holding means for maintaining the parts in the desired position.

An additional object is the provision of a vehicle of this character which will be simple and inexpensive to manufacture, neat and pleasing in appearance, efficient in use, durable in service and a general improvement in the art.

With the above and other objects and advantages in view the invention consists in the details of construction to be hereinafter more fully described and claimed and illustrated in the accompanying drawings, in which:

Figure 1 is a side elevation of the device showing it in use as a rocker,

Figure 2 is a top plan view thereof,

Figure 3 is a vertical section,

Figure 8 is an enlarged top plan view of the tongue or handle, Figure 9 is a detail cross section therethrough on the line 9—9 of Figure 8.

Figure 4:
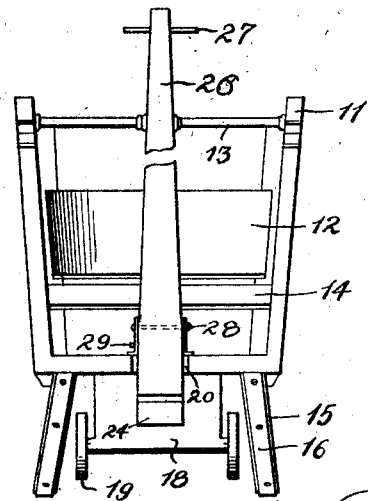
Figure 4 is a front elevation.
Figure 7:
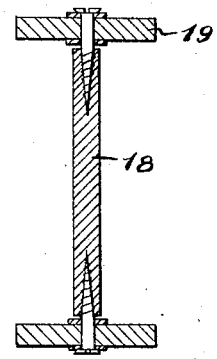
Figure 7 is a cross section on the line 7—7 of Figure 6 taken through the wheels.
Figure 5:
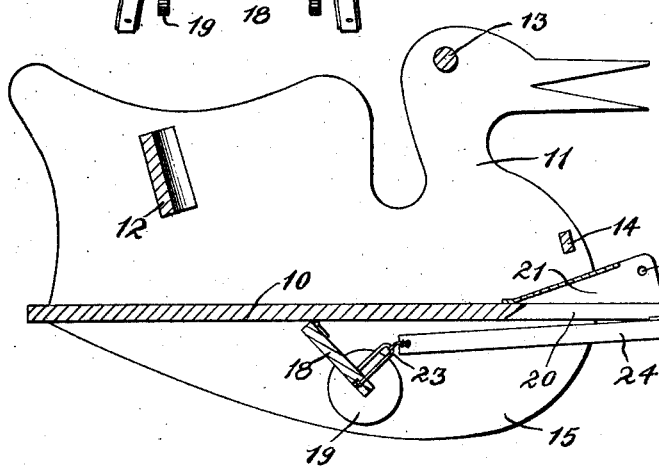
Figure 5 is a longitudinal section showing the device in use as a sled.
Figure 6:
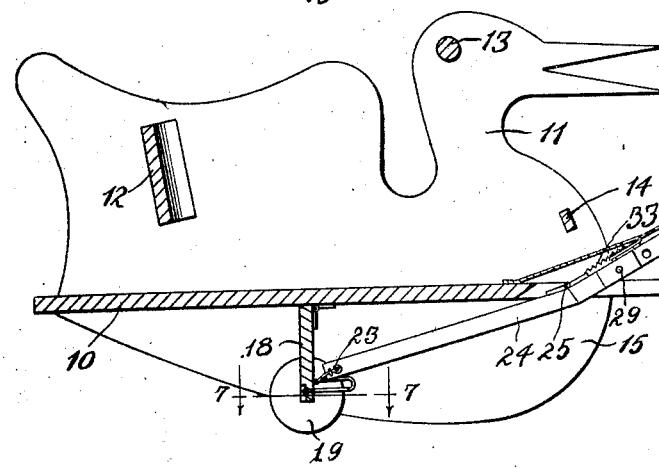
Figure 6 is a longitudinal section showing its use as a cart or wagon.

The remaining figures are detail views.

Referring more particularly to the drawings I have shown the device as including a platform 10 to the side edges of which are secured sides 11 which are here shown as shaped to resemble a duck or swan but which might be of any design which will be attractive to infants or small children. The sides are connected by a rear cross piece 12 which serves as a back brace and are furthermore connected by a front member 13 which serves as a handle for the infant or small child seated upon the platform. I also provide a front cross piece 14 located slightly above the platform to serve as a brace. Secured to and depending from the platform are rockers 15 preferably shod with metal strips 16.

Hinged on the underside of the platform toward the rear portion thereof is a bolster 18 on which are journaled wheels 19. The bolster is swingable so that in one position the wheels will project below the rockers while in another position they will be in unobstructing relation to the surface of the floor or ground.

The forward end of the platform is formed with a cut away portion 20 above which is secured a hood like bracket 21 formed in its upper corners with holes 22. Hingedly connected with the free edge portion of the bolster, as shown at 23 is a bar 24 which extends forwardly along the underside of the platform at its center and which has its free end hingedly connected at 25 with the lower or rear end of the tongue or handle 26. The exact shape and construction of this tongue are immaterial though I have shown its free end as provided with a small cross piece 27 to prevent it from being accidentally drawn through the hands of the person doing the pulling. The tongue is pivoted within the bracket 21 by means of a transverse bolt or pin 28 which passes through the tongue and through the holes 22 in the bracket.

Slidable transversely through the tongue is a plunger 29 to which is pivotally connected one arm 30 of an angle lever 31 pivoted at 32 on the tongue and normally held in one position, with the plunger extended by means of a coil spring 33. Connected with the other arm 34 of the angle lever is a rod 35 which extends longitudinally of the tongue and through guides 36 thereon. The free end of this rod terminates in a finger grip 37 whereby it may be conveniently operated for retracting the plunger when such is desired. One side of the bracket 21 is formed with two holes 38 and 39 within either of which the plunger 29 may be engaged.

When it is desired to use the device as a rocker, the tongue 26 is swung upwardly and rearwardly as far as possible upon its pivot 28 and the plunger 29 is engaged within the hole 38. When this is done the bolster 18 is disposed in its forwardmost swung position close beneath the platform so that the wheels 19 will be out of obstructing relation to the floor or other surface so that the child sitting within the device may rock back and forth without interference or obstruction.

To use the device as a sled, the plunger is withdrawn and disengaged from the hole 38 and the pivot bolt 28 is also removed so as not to interfere with the handle or tongue. The device may then be pulled along, the rockers acting as sled runners. The tension on the tongue or handle holds the bolster in its non-obstructing position.

When it is desired to use the device as a wagon or cart, the pivot bolt 28 is reinserted through the tongue and bracket 21 and the tongue is swung forwardly upon its pivot, whereupon the bar 24 is moved rearwardly, swinging the bolster 18 down into vertical position with the wheels 19 projecting below the rockers so as to roll upon the floor or other surface. The plunger 29 is engaged through the hole 39 for maintaining the parts in this position.

From the foregoing description and a study of the drawings it will be apparent that I have thus provided a simply constructed, inexpensive and highly attractive vehicle which is readily convertible for use in different capacities. Owing to the simplicity of the construction and the fewness of the parts it is evident that there is very little to get out of order so that the device should have a long life and satisfactorily perform all of its functions.

While I have shown and described the preferred embodiment of my invention it is of course to be understood that I reserve the right to make such changes in the form, construction and arrangement of parts as will not depart from the spirit of the invention or the scope of the subjoined claim.

Having thus described my invention I claim:

A child's vehicle comprising a body equipped with rockers, a bolster hingedly mounted on the underside of the body and carrying ground engaging wheels, a bracket at the forward end of the body, a tongue connected at its rear end with the bolster and formed of hingedly connected sections, said bracket being substantially U-shaped and receiving the tongue between the arms thereof, one side of the bracket being formed with a series of holes, a plunger slidable transversely of the tongue and engageable within a selected hole for holding the bolster in a desired position whereby the wheels thereon may be permitted to engage the ground or prevented from engagement therewith, guides on the tongue, a member slidable through the guide and terminating in a finger grip, and an angle lever pivoted on the tongue and having one arm connected with said member and its other arm connected with the plunger.

In testimony whereof I affix my signature.

PATRICK D. EGAN.